Patented Feb. 13, 1945

2,369,270

UNITED STATES PATENT OFFICE 2,369,270

PROCESS FOR REMOVING IRON FROM ZINC SALTS

Myron C. Waddell, Lakewood, Ohio, assignor to E. I. du Pont de Nemours & Company, Wilmington, Del., a corporation of Delaware No Drawing. Application August 17, 1940, Serial No. 353,063

4 Claims. (Cl. 23—50)

This invention relates to the removal of iron which is contained as an impurity in the ferrous state in aqueous solutions of chemicals, as in the manufacture of zinc sulfate and zinc chloride.

In the manufacture of zinc salts the crude liquors contain varying amounts of ferrous iron, depending upon the source of the raw materials and the particular methods of operation. Excessive quantities of iron are removed as much as possible by reduction with zinc and the balance is removed by oxidation to the ferric state and precipitation as ferric hydroxide. This precipitated ferric hydroxide is removed in filter presses, and in the processes heretofore available it has been difficult to obtain satisfactory functioning of the filter presses, especially in systems in which aluminum is also present as an impurity.

I have now found that this difficulty can be remedied by gradually adding the oxidizing agent to a basic solution of the impure salt. Thus, if the oxidizing agent is slowly added to a basic solution containing ferrous iron as an impurity, say over a period of one-half hour or more, so that ferric iron is formed slowly, the ferric hydroxide is precipitated in a readily filterable form.

One application of my invention concerns the purification of zinc sulfate made from galvanizers' waste as set forth in U. S. Patent 2,173,876 granted September 26, 1939 to Robert J. Campbell. The crude zinc sulfate liquor obtained by leaching, liming, and treating with sulfuric acid will normally contain about 53–54 per cent zinc sulfate as $ZnSO_4.7H_2O$ and will be contaminated with varying amounts of heavy metals, iron, manganese and sometimes aluminum. The heavy metals are precipitated by adding finely divided metallic zinc and are filtered off along with the insoluble material not affected by the sulfuric acid. If the iron content is excessive it too will be reduced to some extent by the addition of metallic zinc. An iron content of about 0.2 per cent is typical. The zinc will also neutralize any excess acid if present, but this neutralization is more desirably and more economically effected by adding lime. The solutions thus obtained will have a basicity equivalent to about 0.1 to 1 per cent ZnO and the iron which will be present wholly in the ferrous state may vary between about 0.1 and 0.5 per cent. All per cent unless otherwise indicated are given by weight. The solutions thus obtained are treated with potassium permanganate which oxidizes the iron and manganese. Ferric and manganic hydroxides then precipitate. The potassium permanganate is added in solution but, of course, may be added in other ways, for example as crystal. It is added gradually at the rate of about 3 or 4 pounds of permanganate per ton of liquor per hour. The liquor thus obtained is then passed thru a filter press and the filtrate is passed on to zinc sulfate recovery. The zinc sulfate may be recovered in the form of crystals, flakes, shot or concentrated solutions.

In a typical operation of the character described I have been able to pass one or two 35,000 pound batches of liquor thru the filter press before cleaning is required, whereas with the same type of process in which all the required oxidizing agent is added at once the filter press had to be cleaned after only about one-half a batch had been filtered. In my process a batch can be filtered in two hours whereas before it took about seven hours.

My invention may also be applied to the manufacture of zinc chloride under essentially the same conditions specified for zinc sulfate. Variations of course will be made according to the different natures of the crude and the product but the method of removing the iron is essentially the same. In most zinc chloride operations sodium chlorate is used as the oxidizing agent and a slight excess is required during filtration to prevent redissolution of the iron. The oxidizing agent should be added at essentially the same rate as in the case of zinc sulfate, for in most processes the concentrations in the zinc chloride liquors of both the zinc chloride and the ferrous iron will be essentially the same as in the case of the zinc sulfate liquors. In a typical operation the batch amounts to about 45,000 pounds of 50° Bé. liquor which contains about 0.2 per cent iron. The total chlorate consumption, which runs about 0.15 pounds per 100 pounds of liquor, is added gradually over a period of three-quarters to one hour. A batch thus treated can be filtered in about two and one-half hours whereas about five hours on the average were required when all the chlorate was added at one time.

It will be understood that the foregoing illustrates the application of my invention to particular methods of making zinc salts and that my invention is applicable quite independently of the particular details of these processes. It is particularly applicable, however, to such zinc processes as produce concentrated crude liquors containing less than about one per cent iron. By adjusting the basicity of such solutions equivalent to the iron content and gradually introducing the oxidizing agent over a substantial period an easily filterable precipitate is obtained.

When I speak of a "basic solution" or of "adjusting the basicity of the solution" or use equivalent expressions I do not mean that the solution need actually be alkaline but only that it have a deficiency of the acid radical, e. g. chlorine or sulfate. The basicity of the solution should be at least equivalent to the iron content so that sufficient of the basic salt is present to react with ferric iron to form the hydroxide.

While I have illustrated my invention with particular reference to zinc salts it will be understood that it is also applicable in other types of systems in which ferrous iron is oxidized in a basic solution. Anion active oxidizing agents such as potassium permanganate and sodium chlorate are sufficiently active in basic solutions to be of commercial interest but other types might be employed.

I claim:

1. In a process of manufacture of zinc salts the steps of treating crude solution of zinc salts with metallic zinc to precipitate heavy metals, separating out the precipitate, treating the solution thus obtained with lime to a basicity equivalent to about 0.1 to 1% ZnO and at least equivalent to the iron content of the solution, thereafter adding a compound the anion of which is an active oxidizing agent in order to oxidize ferrous iron to ferric iron, and regulating the addition of said oxidizing agent so that the rate of addition at any instant does not substantially exceed ten pounds per ton of solution per hour.

2. In a process of manufacture of zinc salts the steps of treating a crude solution of zinc salts with metallic zinc to precipitate heavy salts, separating out the precipitate, treating the solution thus obtained with lime to a basicity equivalent to about 0.1 to 1% ZnO and at least equivalent to the iron content of the solution thereafter adding an oxidizing agent selected from the class consisting of permanganates and chlorates and regulating the addition of said oxidizing agent so that the rate of addition at any instant does not substantially exceed ten pounds per ton of solution per hour.

3. In a process of manufacture of zinc salts the steps of treating a crude solution of zinc salts with metallic zinc to precipitate heavy metals, separating out the precipitate, treating the solution thus obtained with lime to a basicity equivalent to about 0.1 to 1% ZnO and at least equivalent to the iron content of the solution, thereafter gradually adding an oxidizing agent selected from the class consisting of permanganates and chlorates slowly and uniformly over a period of at least one-half hour.

4. In a process of manufacture of zinc salts the steps of treating an aqueous solution of zinc salts containing iron compounds in an amount less than one per cent of iron essentially in the ferrous state with sufficient alkaline material to make the solution basic enough to precipitate ferric iron as ferric hydroxide and thereafter gradually adding a compound, the anion of which is an active oxidizing agent in order to oxidize ferrous iron to ferric iron, and regulating the addition of said oxidizing agent so that the rate of addition at any instant does not substantially exceed ten pounds per ton of solution per hour.

MYRON C. WADDELL.